(12) United States Patent
Ewaida et al.

(10) Patent No.: US 11,736,507 B2
(45) Date of Patent: Aug. 22, 2023

(54) TECHNIQUES FOR ANALYZING NETWORK VULNERABILITIES

(71) Applicant: DISNEY ENTERPRISES, INC., Burbank, CA (US)

(72) Inventors: Bashar H. M. Ewaida, Sherman Oaks, CA (US); Brent Chandler Butler, Los Angeles, CA (US); Arleena Faith, New York, NY (US); Joseph Tadashi Ryan, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 182 days.

(21) Appl. No.: 16/714,649

(22) Filed: Dec. 13, 2019

(65) Prior Publication Data

US 2021/0185073 A1    Jun. 17, 2021

(51) Int. Cl.
*H04L 9/40* (2022.01)
*H04L 61/4511* (2022.01)

(52) U.S. Cl.
CPC ...... *H04L 63/1433* (2013.01); *H04L 61/4511* (2022.05); *H04L 63/1416* (2013.01); *H04L 63/1425* (2013.01); *H04L 63/20* (2013.01)

(58) Field of Classification Search
CPC ............. H04L 63/1433; H04L 63/1425; H04L 61/1511; H04L 63/20; H04L 63/1416
See application file for complete search history.

(56) References Cited

U.S. PATENT DOCUMENTS

| | | |
|---|---|---|
| 10,042,862 B2 | 8/2018 | Gorman et al. |
| 11,070,452 B1 | 7/2021 | Roy et al. |
| 11,120,380 B1 | 9/2021 | Narala |
| 11,170,100 B2 | 11/2021 | Fajardo Verano et al. |
| 11,216,563 B1 | 1/2022 | Veselov et al. |
| 11,233,804 B2 | 1/2022 | Arzani et al. |
| 11,323,327 B1 | 5/2022 | Chitalia et al. |
| 11,373,225 B2 | 6/2022 | De Paula Carneiro Ribeiro |

(Continued)

OTHER PUBLICATIONS

Non Final Office Action received for U.S. Appl. No. 16/882,221 dated Jun. 6, 2022, 24 pages.

(Continued)

*Primary Examiner* — Suraj M Joshi
*Assistant Examiner* — Jaren Means
(74) *Attorney, Agent, or Firm* — Artegis Law Group, LLP

(57) ABSTRACT

One embodiment of the present disclosure sets forth a technique for analyzing network vulnerabilities. The technique includes determining an address for each target device included in a plurality of target devices; for each target device, assigning a port scanning task to an associated port scanning service, the port scanning task being associated with the target device via the address of the target device; for each port scanning task, receiving a port scanning result from the port scanning service assigned to the port scanning task, the port scanning result including a list of open ports for the target device associated with the port scanning task; for each open port included in each port scanning result, assigning a vulnerability scanning task to an associated vulnerability service; receiving a vulnerability scanning result for each vulnerability scanning task; and generating a report based on the port scanning results or the vulnerability scanning results.

18 Claims, 6 Drawing Sheets

(56) References Cited

U.S. PATENT DOCUMENTS

| | | |
|---|---|---|
| 2003/0212779 A1* | 11/2003 | Boyter ............... H04L 63/1433 709/223 |
| 2003/0220940 A1 | 11/2003 | Futoransky et al. |
| 2005/0160286 A1* | 7/2005 | Currie ............... H04L 63/1433 726/22 |
| 2010/0180318 A1 | 7/2010 | Salowey et al. |
| 2014/0007241 A1* | 1/2014 | Gula ............... H04L 63/1433 726/25 |
| 2017/0013008 A1 | 1/2017 | Carey et al. |
| 2017/0171231 A1 | 6/2017 | Reybok, Jr. et al. |
| 2017/0257385 A1 | 9/2017 | Overson et al. |
| 2018/0038669 A1 | 2/2018 | Hershey et al. |
| 2019/0095512 A1* | 3/2019 | Mahjoub ............. H04L 43/0876 |
| 2019/0138512 A1 | 5/2019 | Pourmohammad et al. |
| 2019/0166153 A1 | 5/2019 | Steele |
| 2019/0166155 A1 | 5/2019 | Steele et al. |
| 2019/0297118 A1 | 9/2019 | Haugsnes |
| 2020/0356675 A1 | 11/2020 | Shakarian et al. |
| 2021/0044623 A1 | 2/2021 | Bosch et al. |
| 2021/0144178 A1 | 5/2021 | Bailey |
| 2021/0216928 A1 | 7/2021 | O'Toole et al. |
| 2021/0312351 A1 | 10/2021 | Pourmohammad et al. |
| 2021/0342194 A1 | 11/2021 | Zhang |
| 2022/0265239 A1 | 8/2022 | Taylor et al. |

OTHER PUBLICATIONS

Final Office Action received for U.S. Appl. No. 16/882,221 dated Oct. 31, 2022, 19 pages.
Non Final Office Action received for U.S. Appl. No. 16/882,221 dated Jun. 1, 2023, 18 pages.

* cited by examiner

TECHNIQUES FOR ANALYZING NETWORK VULNERABILITIES

BACKGROUND OF THE INVENTION

Field of the Invention

The various embodiments relate generally to security of computing devices and, more particularly, to techniques for analyzing network vulnerabilities.

Description of the Related Art

Network connected computing devices, including devices providing content and/or services for other computing devices over networks, such as the Internet, are often subject to attack by hackers, malware, and/or the like. One common form of attack is based on port scanning. In a port scanning attack, a port scanning toolkit is used to systematically scan each of the network ports at a target IP address to determine which ports have a service that is open and listening on the port. Once a port is determined to be open, malware tools are used to initiate various attacks on the listening service to see if the listening service is susceptible to any vulnerability that may be used to gain unauthorized access to the computing device.

To help safeguard against these types of attacks, the information technology (IT) team of the owner of a computing system typically performs a port scanning "attack" on each computing device of the computing system to assess whether any of the computing devices has one or more vulnerabilities on one or more of the ports of the computing device. Once the one or more vulnerabilities are identified, the IT team can then follow up by closing ports that are unnecessarily open, installing patches and/or security updates, and/or the like to eliminate the one or more vulnerabilities. Further, the IT team may perform this port-scanning "attack" regularly to assess software updates on the computing device, assess the open ports for newly discovered vulnerabilities, and/or the like.

For an enterprise with a limited number of computing devices, performing systematic port scanning can often be managed by simply maintaining a list of known computing devices of the enterprise (e.g., by keeping a list of IP addresses for each of the computing devices) and scheduling regular port scans. This approach, however, does not scale well when the enterprise has a large number of computing devices, computing devices spread across multiple IP address ranges or subnets, computing devices hosted by cloud service providers who may periodically change the IP address assigned to different computing devices, computing devices being constantly brought into service and/or taken out of service, and/or the like. In addition to the problem of how to keep track of all of the computing devices, the IT team may also have difficulties ensuring that all of the computing devices are being port scanned regularly, that vulnerability assessment resources are being effectively assigned to perform the network vulnerability assessment, that an accurate assessment of network vulnerabilities of the enterprise as a whole is being performed, and/or the like.

As the foregoing illustrates, what is needed in the art are more effective approaches for assessing and analyzing network vulnerabilities.

SUMMARY

One embodiment disclosed herein sets forth a computer-implemented method for analyzing network vulnerabilities. The method includes determining an address for each target device included in a plurality of target devices; for each target device included in the plurality of target devices, assigning a port scanning task to an associated port scanning service, the port scanning task being associated with the target device via the address of the target device; for each port scanning task, receiving a port scanning result from the port scanning service assigned to the port scanning task, the port scanning result including a list of one or more open ports for the target device associated with the port scanning task; for each open port included in each port scanning result, assigning a vulnerability scanning task to an associated vulnerability service; receiving a vulnerability scanning result for each vulnerability scanning task; and generating a report based on at least one of the port scanning results or the vulnerability scanning results.

Further embodiments provide, among other things, a non-transitory computer-readable storage medium and a computing device configured to implement the method set forth above.

At least one technical advantage of the disclosed techniques relative to the prior art is that the disclosed techniques can be used to verify that the computing devices of an enterprise are being effectively identified, even when those computing devices are being brought into service, are being removed from service, and/or are being assigned to different IP addresses. Not only does the identification of the computing devices help ensure that all of the computing devices are being assessed for network vulnerabilities, but the identification of the computing devices also helps ensure that a port scanning "attack" is not being inadvertently performed on a computing device controlled by another entity. Additionally, the disclosed techniques employ a tiered scanning approach that allows the port scanning and network vulnerability assessment to be performed more efficiently and with fewer computing resources relative to prior art approaches by limiting more time consuming and/or costly scans to only those computing devices and/or services that need the more time consuming and/or costly scans. The disclosed techniques further provide automated mechanisms for assigning scanning and vulnerability assessment resources, identifying computing devices that require atypical scanning and network vulnerability assessment approaches, and/or identifying computing devices with anomalous scanning results. These technical advantages provide one or more technological advancements over prior art approaches.

BRIEF DESCRIPTION OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments of the inventive concepts and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
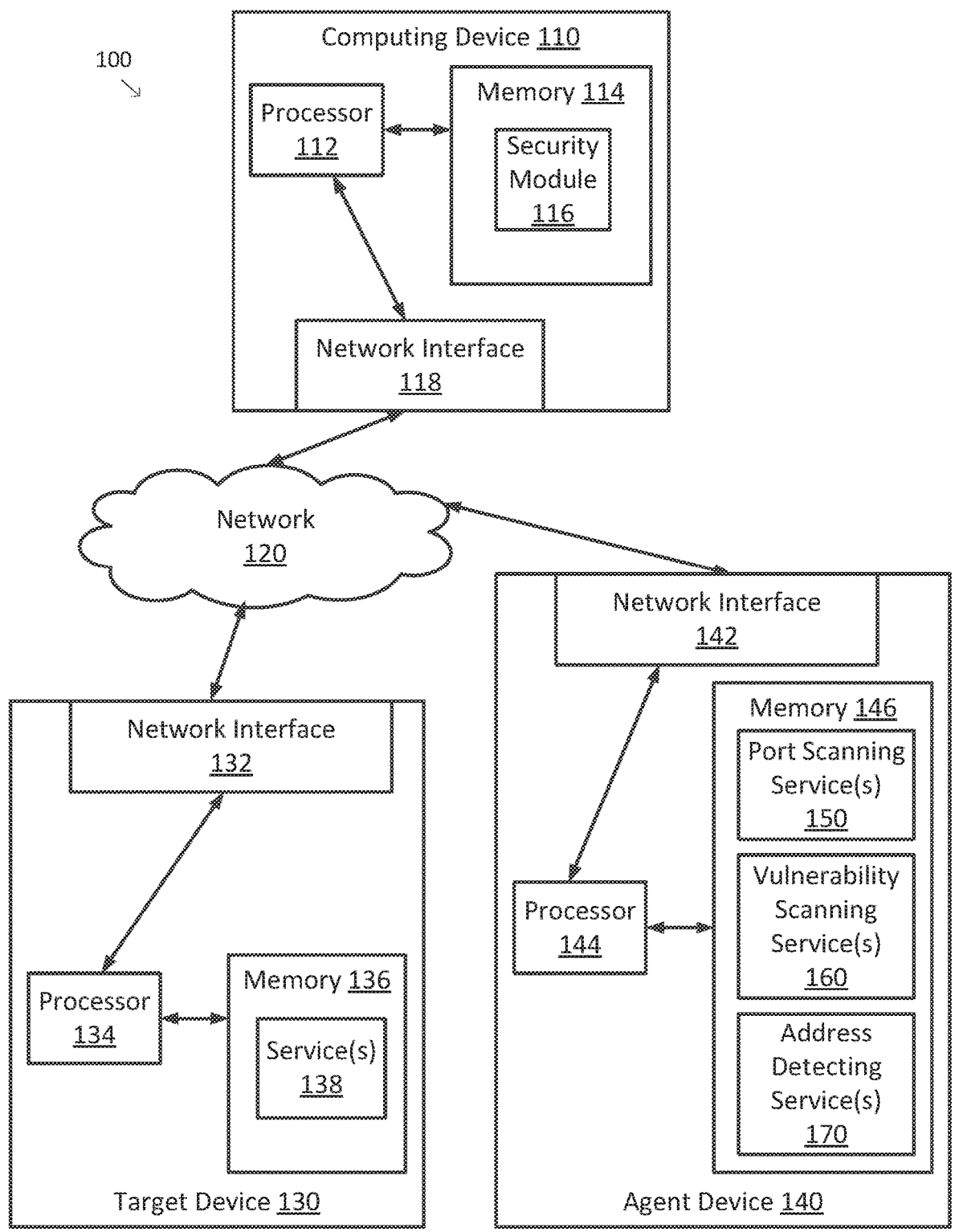
FIG. 1 illustrates a computing system configured to implement one or more aspects of the various embodiments.

FIG. 1 illustrates a computing system 100 configured to implement one or more aspects of the various embodiments. As shown in FIG. 1, computing system 100 includes a computing device 110. Computing device 110 includes a processor 112 coupled to memory 114. Operation of computing device 110 is controlled by processor 112. And although computing device 110 is shown with only one processor 112, it is understood that processor 112 may be representative of one or more central processing units, multi-core processors, microprocessors, microcontrollers, digital signal processors, field programmable gate arrays (FPGAs), application specific integrated circuits (ASICs), graphics processing units (CPUs), tensor processing units (TPUs), and/or the like in computing device 110. Computing device 110 may be implemented as a stand-alone subsystem such as a server, as a board added to another computing device, and/or as a virtual machine.

Memory 114 may be used to store software executed by computing device 110 and/or one or more data structures used during operation of computing device 110. Memory 114 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As shown, memory 114 includes a security module 116 that is responsible for controlling one or more aspects of the operation of computing device 110, including, for example, the management of network vulnerability scans for one or more target devices (e.g., a target device 130) as is described in further detail below. And although security module 116 is characterized as a software module, security module 116 may be implemented using software, hardware, and/or a combination of hardware and software.

In order to support the management of network vulnerability scans for one or more target devices, computing device 110 includes a network interface 118 coupling computing device 110 and processor 112 to a network 120. Network interface 118 may include one or more network interface cards, network interface chips, and/or the like providing support for at least the low-level connectivity to network 120, such as by providing the network access functionality for one or more network types under the TCP/IP protocol and/or the physical and data link layers of the OSI networking model for the one more network types. In some examples, the one or more network types may include wired, fiber optic, and/or wireless network types including Ethernets, fibre channels, and/or the like.

Network 120 may include any type of network types, network equipment, and/or the like. In some examples, network 120 may include one or more switches, routers, hubs, gateways, and/or the like. In some examples, network 120 may include one or more local area networks (LANs) (e.g., an Ethernet), one or more wide area networks (e.g., the Internet), and/or the like.

Also shown in FIG. 1 is target device 130. Target device 130 includes examples of representative features and characteristics that may be typical of the target devices that are to be scanned for network vulnerabilities under the management of security module 116. For example, target device 130 is shown with a network interface 132 coupling target device 130 to network 120, a processor 134 coupled to network interface 132, and a memory 136 coupled to processor 134. In some examples, network interface 132, processor 134, and memory 136 may be substantially similar to network interface 118, processor 112, and memory 114, respectively. And although target device 130 is shown as a stand-alone computing device, target device 130 may also be representative of a board added to another computing device, and/or as a virtual machine. Target device 130 is further associated with a network address, such as an IP address (e.g., an IPv4 or an IPV6 address).

Memory 136 is also shown with one or more services 138. Each of the one or more services 138 is configured to listen to a respective one or more logical ports of target device 130 so that service 138 receives incoming network traffic addressed to the respective one or more logical ports associated with servicer 138 and generates outgoing network traffic on the respective one or more logical ports that are responsive to the incoming network traffic that was received. In this way, each of the one or more services 138 is able to receive and respond to communications and/or service requests from other computing devices coupled to target device 130 via network 120. As but a few of many possible examples, each of the one or more services 138 may correspond to a File Transfer Protocol (FTP) service, a Telnet service, a Simple Mail Transfer Protocol (SMTP) service, a Post Office Protocol (POP) service, an Internet Message Access Protocol (IMAP) service, a Hypertext Transfer Protocol (HTTP) service, a Hypertext Transfer Protocol Secure (HTTPS) service a Remote Desktop Protocol (RDP) service, a database access service, a Secure Shell (SSH) service, a Server Message Block Protocol (SMB) service, and/or the like. In addition, because at least one of the one or more services 138 is listening and responding to network traffic addressed to the respective one or more logical ports, the respective one or more logical ports are considered to be open. In some examples, the respective one or more logical ports may correspond to any of the 65,536 UDP or TCP ports typically used with network connected target devices like target device 130. And although the one or more services 138 are characterized as a software module, each of the one or more services 138 may be implemented using software, hardware, and/or a combination of hardware and software.

When there are a large number of target devices like target device 130, security module 116 is not able to perform each of the network vulnerability scans itself. In some examples, security module 116 may assign one or more tasks to one or more agent devices, which may correspond to cloud computing devices. FIG. 1, shows an agent device 140, which may be representative of any of the one or more agent devices usable by security module 116.

As shown, agent device 140 includes examples of representative features and characteristics that may be typical of the agent devices to which security module 116 assigns one or more tasks. For example, agent device 140 is shown with a network interface 142 coupling agent device 140 to network 120, a processor 144 coupled to network interface 142, and a memory 146 coupled to processor 144. In some examples, network interface 142, processor 144, and memory 146 may be substantially similar to network interface 118, processor 112, and memory 114, respectively. And although agent device 140 is shown as a stand-alone computing device, agent device 140 may also be representative of a board added to another computing device, and/or as a virtual machine.

Memory 146 is also shown with various services that security module 116 may assign the one or more tasks to. More specifically, agent device 140 and memory 146 are shown with one or more port scanners or port scanning services 150, one or more vulnerability scanners or vulnerability scanning services 160, and one or more address detecting services 170. However, in other embodiments, an agent device may include only one or two types of services 150, 160, and/or 170, may include only one of a particular type of service 150, 160, and/or 170, and/or any combination thereof.

Each of the one or more port scanning services 150 communicates with security module 116 and is assigned one or more addresses, where each of the one or more addresses corresponds to a respective target device, and performs a port scan of each of the respective target devices as is discussed in further detail below. In some examples, the addresses correspond to network addresses, such as IP addresses of the target devices. In some examples, the number of the one or more port scanning services 150 to be used by security module 116 may be determined based on one or more of a desired primary scanning frequency at which each of the target devices is to be scanned, an expected duration of each port scan, a number of addresses/target devices to scan, and/or the like. As but some non-limiting examples, the primary scanning frequency may be every six hours, every twelve hours, every day, every week, and/or the like.

Each of the one or more vulnerability scanning services 160 communicates with security module 116, is assigned one or more port and address combinations, and performs a vulnerability scan on each of the one or more port and address combinations as is described in further detail below. In some examples, the number of the one or more vulnerability scanning services 160 to be used by security module 116 may be determined based on one or more of the desired primary scanning frequency, an expected duration of each vulnerability scan, a number of port and address combinations to scan and/or expected to be scanned, and/or the like.

Each of the one or more address detecting services 170 communicates with security module 116 and helps security module 116 identify the addresses of target devices that are to be scanned for network vulnerabilities. And although the one or more services 150, 160, and/or 170 are characterized as a software module, each of the one or more services 150, 160, and/or 170 may be implemented using software, hardware, and/or a combination of hardware and software.

In some examples, each of the one or more address detecting services 170 may rely on different types of information to identify the address of a target device, such as target device 130. In some examples, one or more of the one or more address detecting services 170 may examine domain name service (DNS) information to determine whether one or more DNS servers have entries corresponding to domain names and/or uniform resource locators (URLs) that are of interest to security module 116. In some examples, one or more of the one or more address detecting services 170 may examine autonomous system number (ASN) whether one or more ASN lookup services have information on target devices 130 that are of interest to security module 116. In some examples, the domain names and/or URLs may correspond to domain names and URLs, respectively, owned, controlled, and/or managed by the entity operating security module 116 and/or affiliates of the entity. In some examples, one or more of the one or more address detecting services 170 may examine ownership information for the domain names and/or URLs of interest. In some examples, one or more of the one or more address detecting services 170 may examine security and/or encryption certificates (such as for public and/or private encryption keys) owned, controlled, and/or used by the entity and/or affiliates of the entity to determine issuer and/or issued to information. In some examples, the certificates may be issued by, maintained by, and/or managed by a third-party certificate service or registry. In some examples, the ownership information may be determined using one or more domain registry searches, International Corporation for Assigned Names and Numbers (ICANN) registry lookups, Whois lookups, Autonomous System Number (ASN) lookups, Open Source Intelligence (OSINT) lookups, certificate registry lookups, and/or the like. In some examples, one or more of the one or more address detecting services 170 may use information from one or more opt-in tracking services. In some examples, certain end users may opt-in to a tracking service that is configured to track the addresses of target devices providing services, serving content, and/or the like to the opted-in end users. In some examples, the one or more address detecting services 170 may limit their identification of addresses to information collected and/or queried within a recent period of time. In some examples, the recent period of time may be limited to a time since a last network vulnerability scan, a configurable period of time (e.g., one, two, or three days), and/or the like.

As discussed above and further emphasized here, FIG. 1 is merely an example which should not unduly limit the scope of the claims. One of ordinary skill in the art would recognize many variations, alternatives, and modifications. According to some embodiments, the distribution of security module 116, the one or more services 138, the one or more port scanning services 150, the one or more vulnerability scanning services 160, and/or the one or more address detecting services 170 may be arranged among computing device 110, target device 130, and/or agent device 140 in different ways than as expressly depicted in FIG. 1. For example, one or more of the one or more the one or more port scanning services 150, the one or more vulnerability scanning services 160, and/or the one or more address detecting services 170 may be located on computing device 110 and/or target device 130. As another example, security module 116 may be located on target device 130 and/or agent device 140. As yet another example, computing device 110 and/or agent device 140 may also be a target device so that the one or more services 138 may be located on computing device 110 and/or agent device 140.

Security Module for Analyzing Network Vulnerabilities

Figure 2:
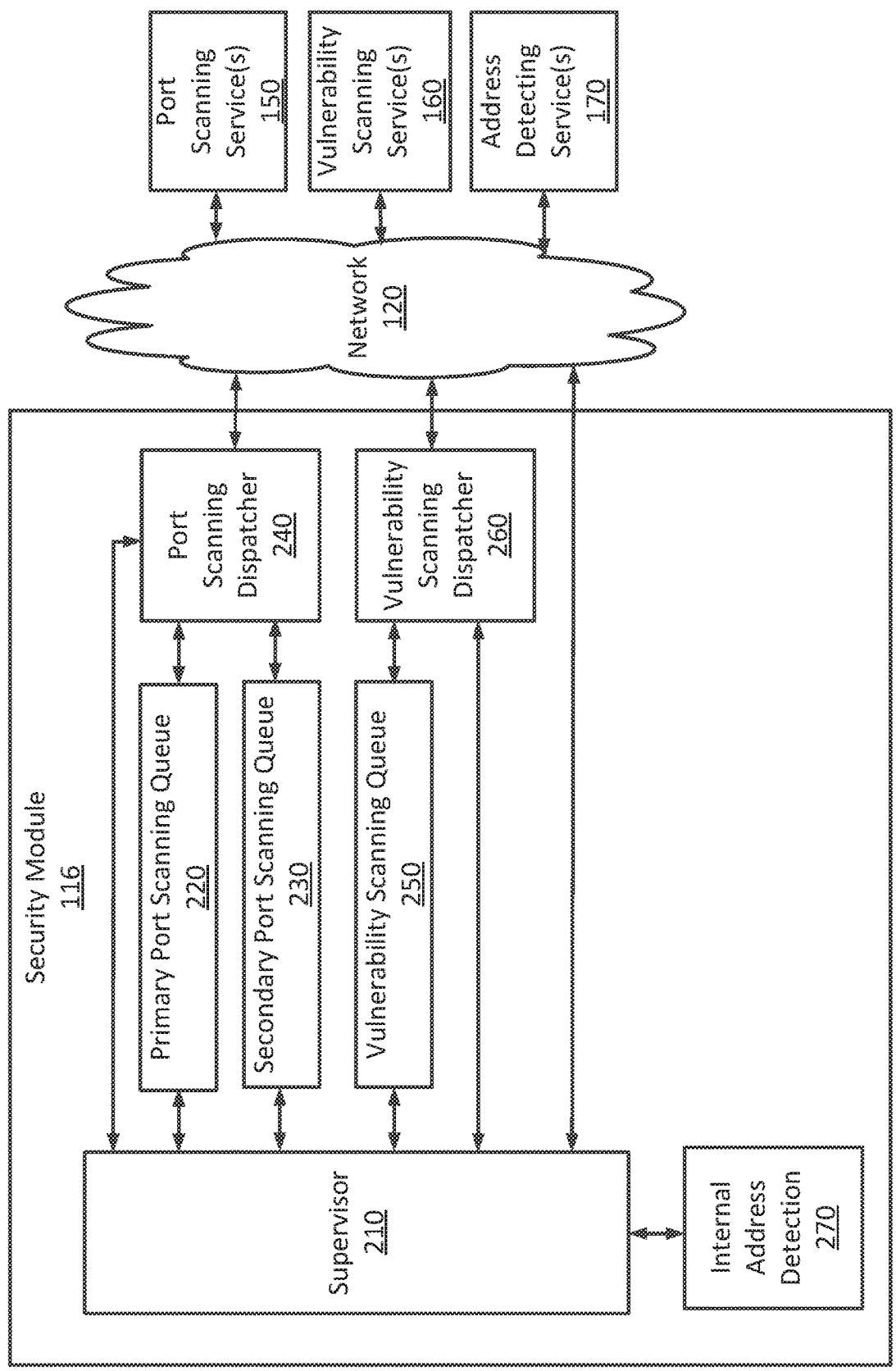
FIG. 2 is a more detailed illustration of the security module of FIG. 1 to implement one or more aspects of the various embodiments.

FIG. 2 is a more detailed illustration of security module 116 to implement one or more aspects of the various embodiments. As shown, security module 116 includes a supervisor 210, a primary port scanning queue 220, a secondary port scanning queue 230, a port scanning dispatcher 240, a vulnerability scanning queue 250, a vulnerability scanning dispatcher 260, and an internal address detection module 270. Supervisor 210 is responsible for managing and coordinating the network vulnerability assessment activities of security module 116. Supervisor 210 further oversees and manages the activities of primary port scanning queue 220, secondary port scanning queue 230, port scanning dispatcher 240, vulnerability scanning queue 250, vulnerability scanning dispatcher 260, and internal address detection module 270. In more detail, supervisor 210 is responsible for one or more of determining the addresses of target devices that are to be assessed for network vulnerabilities, coordinating the assignment of scanning and vulnerability assessment resources to services that perform the scanning and vulnerability assessments, collecting and reporting the results of the scanning and vulnerability assessments, handling anomalous, exception, and/or atypical results, network vulnerability self-healing, network adaptability, and/or the like. The functions and actions of supervisor 210 and security module 116 are described in further detail below with respect to FIGS. 3-5.

Under the supervision of supervisor 210, port scanning dispatcher 240 manages the assignment of port scanning tasks to the one or more port scanning services 150. To help organize and keep track of the numerous port scanning tasks that are to take place, port scanning dispatcher 240 employs primary port scanning queue 220 and secondary port scanning queue 230. Primary port scanning queue 220 is used to maintain a queue of pending port scanning tasks that have not yet been assigned to one of the one or more port scanning services 150, where each of the port scanning tasks in primary port scanning queue 220 includes at least an address of a target device, such as target device 130, that is to be subject to a port scan at the primary scanning frequency.

Secondary port scanning queue 230 is used to maintain a queue of pending port scanning tasks that have not yet been assigned to one of the one or more port scanning services 150, where each of the scanning tasks in secondary port scanning queue 230 includes at least an address of a target device, such as target device 130, that is to be subject to a port scan at a secondary scanning frequency that is less frequent than the primary scanning frequency. In some examples, the port scanning tasks in secondary port scanning queue 230 correspond to addresses or target devices for which problems have occurred during previous port scanning attempts. In some non-limiting examples, when the primary scanning frequency is every day (e.g., has a primary scanning period of a day), the secondary scanning frequency may be every week, every 10 days, every two weeks, and/or the like (e.g., has a secondary scanning period of a week, 10 days, two weeks, and/or the like). In some examples, the length of the second scanning period may be an integral multiple of the length of the primary scanning period.

The port scanning tasks are pushed onto primary port scanning queue 220 and secondary port scanning queue 230 by supervisor 210. Supervisor 210 determines which of primary port scanning queue 220 and secondary port scanning queue 230 to push each of the port scanning tasks based on recorded information regarding previous port scans of the address and/or the target device associated with the port scanning task. A port scanning task associated with an address or target device that has fewer than a threshold number of failed, slow, incomplete, and/or anomalous port scans during a configurable number of primary scans is pushed onto primary port scanning queue 220 where the address or target device is subjected to a port scan at the primary scanning frequency. In some examples, the threshold number of failed, slow, incomplete, and/or anomalous port scans is one, two, three, or more. In some non-limiting examples, the configurable number of primary scans is five, ten, twenty, and/or the like. A port scanning task associated with an address or target device that has the same or more than the threshold number of failed, slow, incomplete, and/or anomalous port scans during the configurable number of primary scans is pushed onto secondary port scanning queue 230 where the address or target device is subjected to a port scan at the secondary scanning frequency.

As port scanning dispatcher 240 receives each request for a port scanning task from one of the one or more port scanning services 150, port scanning dispatcher 240 pops a port scanning task off (e.g., removes a next port scanning task from) of either primary port scanning queue 220 or secondary port scanning queue 230 and sends the port scanning task to the assigned one of the one or more port scanning services 150 for completion. In most cases, port scanning dispatcher 240 pops the port scanning task from primary port scanning queue 220 as each of the port scanning tasks in primary port scanning queue 220 is scheduled to be completed at the current primary scanning frequency, whereas the port scanning tasks in secondary port scanning queue 230 may be completed at the less frequent secondary scanning frequency. In some examples, port scanning dispatcher 240 may pop the port scanning task from secondary port scanning queue 230 rather than primary port scanning queue 220 based on one or more of a number of port scanning tasks in secondary port scanning queue 230, an expected time to complete a port scanning task in secondary port scanning queue 230, an amount of time remaining in a current secondary scanning period, an amount of time remaining in a current primary scanning period, and/or the like. In some examples, when port scanning dispatcher 240 assigns the port scanning task to the assigned port scanning service 150, port scanning dispatcher 240 may provide the assigned port scanning service 150 with a target scanning duration based on which of primary port scanning queue 220 or secondary port scanning queue 230 the port scanning task was popped from. In some examples, the target scanning duration may be a multiple of an expected amount of time for the port scanning task to complete. In some non-limiting examples, the multiple may be 1.5, 2.0, 2.5, and/or the like. In some examples, the multiple may be determined based on a record of previous port scan durations for the target device and/or address associated with the port scanning task.

When the assigned port scanning service 150 returns a report on the port scanning task, the report is analyzed by port scanning dispatcher 240 or passed by port scanning dispatcher 240 to supervisor 210 for analysis. For each of the ports identified as open by the port scanning task, a combination of the address associated with the port scanning task and the open port are used to generate a vulnerability scanning task, which gets pushed onto vulnerability scanning queue 250 for processing as described further below. In some examples, the report may additionally include an indication of how long the assigned port scanning service 150 took to complete the port scanning task.

When the assigned port scanning service 150 reports that the port scan is complete and there are now fewer than the threshold number of failed, slow, incomplete, and/or anomalous port scans during the configurable number of primary scans for the address or target device, the address and/or target device associated with the port scanning task is coded so that the next time the address and/or target device is to be port scanned, the associated port scanning task gets pushed onto primary port scanning queue 220.

When the assigned port scanning service 150 reports that the port scan is incomplete, the port scanning task is pushed onto either primary port scanning queue 220 or secondary port scanning queue 230. The port scanning task is pushed back onto primary port scanning queue 220 when, despite this incomplete scan, fewer than the threshold number of failed, slow, incomplete, and/or anomalous port scans during the configurable number of primary scans are noted for the address or target device of the port scanning task. The port scanning task is pushed onto secondary port scanning queue 230 when the threshold number of failed, slow, incomplete, and/or anomalous port scans during the configurable number of primary scans are reached or exceeded for the address or target device of the port scanning task.

When the assigned port scanning service 150 reports that the port scan detected an anomalous scan as described in further detail below, the port scanning task is pushed onto secondary port scanning queue 230 and the address and/or target device of the port scanning task is coded for port scanning at the secondary scanning frequency.

Figure 4:
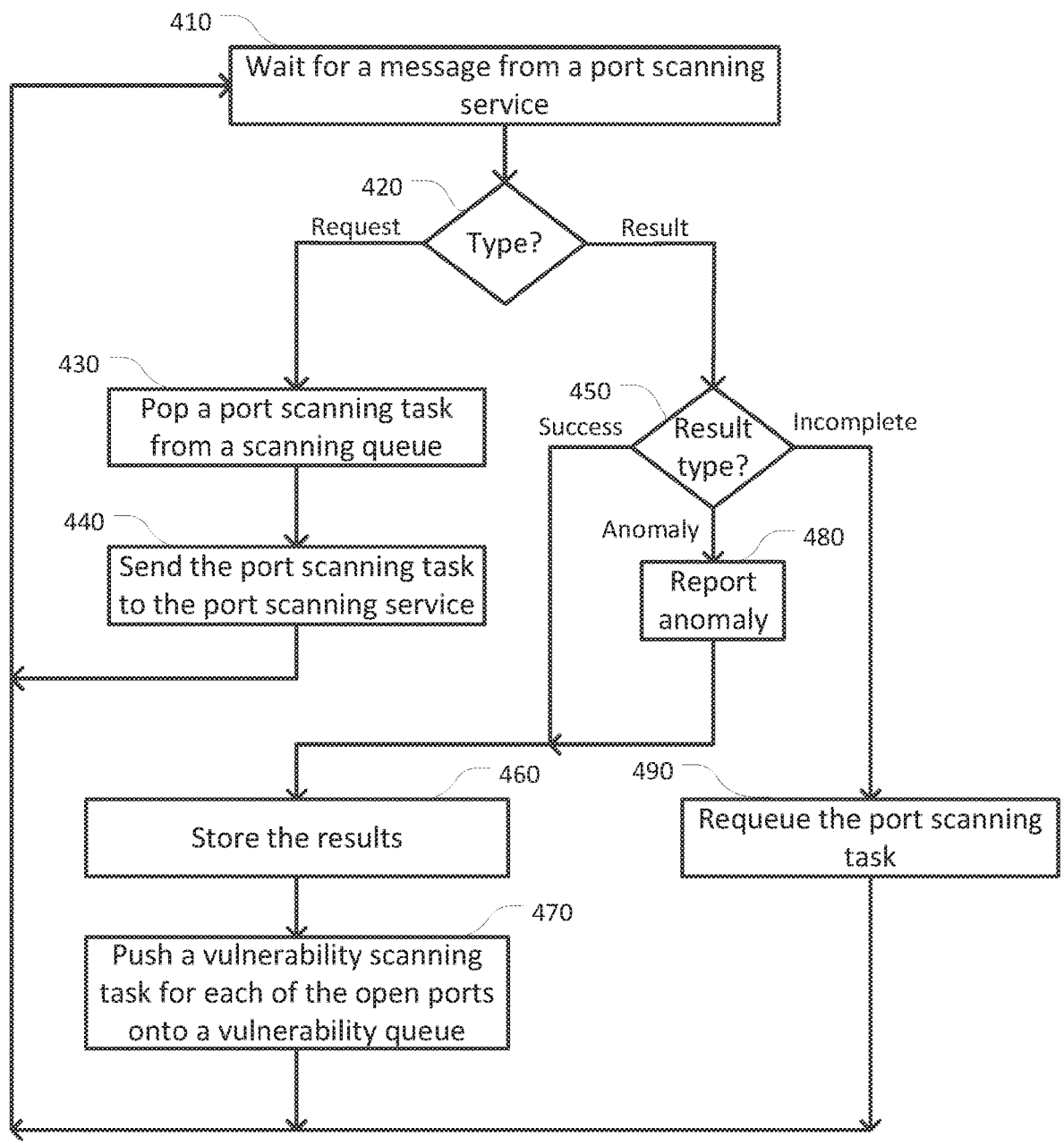
FIG. 4 sets forth a flow diagram of method steps for port scanning target devices using port scanning services to implement one or more aspects of the various embodiments.

The operation of port scanning dispatcher 240 is described in further detail below with respect to FIG. 4.

Once analyzed, the results of the port scanning tasks and any relevant analysis are stored for later use and/or for further analysis as is described in further detail below.

In some embodiments, port scanning dispatcher 240 may additionally and/or alternatively consider one or more additional criteria when assigning port scanning tasks to one of the one or more port scanning services 150 rather than simply popping the next port scanning task off the primary port scanning queue 220 or secondary port scanning queue 230. In some examples, the one or more additional criteria may include a geographic location of port scanning service 150 to which the port scanning task is to be assigned, a service provider for port scanning service 150, a geographic location of a target device 130 corresponding to the port scanning task, a service provider of target device 130, a number of network hops between port scanning service 150 and target device 130, an address of port scanning service 150, whether the port scanning service 150 has recently successfully and/or unsuccessfully completed a port scan of target device 130, and/or the like. In some examples, one or more heuristic rules may be used to assign a port scanning service 150 to a port scanning task based on the one or more additional criteria.

In some embodiments, port scanning dispatcher 240 may additionally and/or alternatively assign port scanning tasks to one of the one or more port scanning services 150 to provide diversity and/or variability to the one or more port scanning services 150 that is used to perform a port scanning task on a particular target device 130. In some examples, a record may be kept of which port scanning service 150 is used to perform a port scanning task on a particular target device 130, and/or one or more characteristics of port scanning service 150. In some examples, port scanning tasks may be assigned so that different port scanning services 150 may be used for different port scans of a particular target device 130. In some examples, port scanning tasks may be assigned so that port scanning services 150 with different characteristics may be used for different port scans of a particular target device 130. Examples of different characteristics include one or more of a geolocation of the particular target device 130 and/or the agent device 140 hosting a particular port scanning service 150, a service provider for port scanning service 150, a number of network hops between port scanning service 150 and target device 130, an address of port scanning service 150, and/or the like. In some examples, different port scans of a particular target device 130 may be performed with port scanning services 150 having different geolocations (e.g., Eastern United States, Western United States, Europe, Asia, and/or the like) to determine a more comprehensive indication of whether geolocation is relevant to network vulnerability and/or to address issues that may interfere with a port scanning task. In some examples, the issues may include one or more of geographic-based network congestion, bandwidth throttling, blacklisting of agent devices 140, and/or the like. In some examples, one or more heuristic rules may be used to assign a port scanning service 150 to a port scanning task based on diversity and/or variability.

Under the supervision of supervisor 210, vulnerability scanning dispatcher 260 manages the assignment of vulnerability scanning tasks to the one or more vulnerability scanning services 160. To help organize and keep track of the numerous vulnerability scanning tasks that are to take place, vulnerability scanning dispatcher 260 employs vulnerability scanning queue 250. Vulnerability scanning queue 250 is used to maintain a queue of pending vulnerability scanning tasks that have not yet been assigned to one of the one or more vulnerability scanning services 160, where each of the vulnerability scanning tasks in vulnerability scanning queue 250 includes at least a combination of an address of a target device, such as target device 130, and a port that is to be subject to a vulnerability scan. Because vulnerability scanning is considerably more expensive in terms of computing time, computing resources, and monetary cost, the placement of only those vulnerability scanning tasks associated with open ports at the indicated address ensures that vulnerability scanning resources are targeted only to the subset of addresses and ports where a vulnerability scan is needed.

The vulnerability scanning tasks are pushed onto vulnerability scanning queue 250 by supervisor 210 or port scanning dispatcher 240. Supervisor 210 and/or port scanning dispatcher 240 determines which address and port combinations to push onto vulnerability scanning queue 250 based on the results of the port scanning tasks completed by each of the port scanning services 150.

As vulnerability scanning dispatcher 260 receives each request for a vulnerability scanning task from one of the one or more vulnerability scanning services 160, vulnerability scanning dispatcher 260 pops a vulnerability scanning task off of vulnerability scanning queue 250 and sends the vulnerability scanning task to the assigned one of the one or more vulnerability scanning services 160 for completion. The operation of vulnerability scanning dispatcher 260 is described in further detail below with respect to FIG. 5.

Supervisor 210 is additionally responsible for determining the addresses of each of the target devices to be analyzed for network vulnerabilities. When an enterprise has a large number of target devices, target devices spread across multiple address ranges or subnets, target devices hosted by cloud service providers who may periodically change the address assigned to different target devices, target devices being constantly brought into service and/or taken out of service, and/or the like, tracking the addresses of each of the target devices which should be subject to network vulnerability analysis is not as simple as merely keeping a static list of the addresses of the target devices. In practice, it is useful to use multiple mechanisms to try to identify the address of each of the target devices.

In some examples, one way of tracking the target devices is to keep track of them using a symbolic name such as a domain name, a URL, and/or the like. In some examples, other ways of tracking the target devices is to keep track of the ASNs for which the target devices are a member. However, just knowing the symbolic name and/or the ASN is not sufficient as unlike the symbolic name and/or ASN, the address of a corresponding target device may periodically change as a service provider moves the target device to a new host, target devices are assigned addresses dynamically (e.g., from a pool of addresses managed by a service provider), target devices are taken down and brought back up, and/or the like. In addition, some symbolic names and/or ASNs may correspond to multiple addresses and/or blocks of addresses. In some examples, there are services and tools that are able to determine the address assigned to a symbolic name. In some examples, these include services that take advantage of DNS information, ownership information, ASN information, certificate information, and/or the like. However, because DNS, ownership information ASN information, certificate information, and/or the like is typically cached, the address information provided by DNS servers, ownership databases, ASN lookups, certificate lookups, and/or the like may not always be up to date. Accordingly, DNS information, ownership information, ASN information, certificate information, and/or the like to determine an address of a target device is best relied upon via redundancy.

In some examples, supervisor 210 may obtain address information for the target device from one or more of the one or more address detecting services 170 that determine the addresses from DNS information, ownership information, ASN information, certificate information, and/or the like. In some examples, to determine the addresses with higher confidence, supervisor 210 may accept an address for a particular target device when the address for that that target device is reported by at least a predetermined number of one of the one or more address detecting services 170. In some non-limiting examples, the predetermined number is two, three, four, or more of the one or more address detecting services 170 that rely on DNS information, ownership information, ASN information, certificate information, and/or the like. In some examples, the number of the one or more address detecting services 170 that have to agree on an address may be increased when the target device has a pattern of regularly having different addresses assigned to the target device (e.g., more than or equal to a predetermined number of addresses per a predetermine duration of time, for example, two or more different addresses per week, two or more different addresses per day, a new address daily, two or more different addresses per hour, and/or the like). In some examples, the pattern of address changes may be determined by keeping a history of addresses for the target device and date/time ranges for each of the addresses. Supervisor 210 then maintains a list of each of the target devices and addresses for which an address has been determined using DNS information, ownership information, ASN information, certificate information, and/or the like.

In some examples, supervisor 210 may additionally and/or alternatively obtain address information for the target device from one or more of the one or more address detecting services 170 that determine the addresses from tracking information, such as the one or more opt-in tracking services described above. Because the opt-in tracking services identify the addresses of target devices based on the actual address of the target device that responded to a service request and/or served content to an opt-in end user, this source of address information is considered a more reliable source, and an address reported by just one of the one or more opt-in tracking services is sufficient to place the target device and the address on the list of reliable target devices and addresses being maintained by supervisor 210. In some examples, when there is a conflict in an address reported by two or more of the opt-in tracking services for a target device, the address most recently tracked is used. In some examples, when there is a conflict between an address provided by an opt-in tracking service and an address detected using DNS information, ownership information, ASN information, certificate information, and/or the like, the address provided by the opt-in tracking service is used. In some examples, an opt-in tracking service may be used for target devices 130 hosted by third-party service providers, hosted in the cloud, and/or the like.

In some embodiments, supervisor 210 may optionally validate the list of reliable target devices and addresses using one or more internal address detection modules 270. In some examples, the one or more internal address detection modules 270 may use internally-maintained DNS information, active directory information, and/or like maintained by the enterprise to determine the addresses of target devices assigned to one or more domains (e.g., Disney.com) maintained by the enterprise. Addresses which are validated by the internal address detection modules 270 are kept on the list of reliable target devices and address.

Once the reliable target devices and addresses are determined and/or optionally, validated, supervisor 210 uses this information to generate the port scanning tasks that are pushed on primary port scanning queue 220 and/or secondary port scanning queue 230.

As discussed above and further emphasized here, FIG. 2 is merely an example which should not unduly limit the scope of the claims. One of ordinary skill in the art would recognize many variations, alternatives, and modifications. According to some embodiments, the architecture of FIG. 2 may be configured differently than as shown in FIG. 2. In some examples, some or all of the one or more internal address detection modules 270 may be separate from security module 116, in a computing device other than computing device 110, and/or the like. In some examples, secondary port scanning queue 230 is optional and the target devices coded for scanning at the secondary scanning frequency may have corresponding port scanning tasks pushed onto the primary port scanning queue 220 at the secondary scanning frequency rather than the primary scanning frequency used for the rest of the port scanning tasks. In some examples, security module 116 may include more than two port scanning queues when more than two scanning frequencies are to be used to complete the port scanning tasks. In some examples, one or more additional vulnerability scanning queues may be used when vulnerability scanning is to occur at different scanning frequencies.

FIGS. 3-6 are now described in the context of the computing system of FIG. 1 and the block diagram of FIG. 2. However, it is understood that the embodiments of FIGS. 3-6 may be adapted to other arrangements of computing devices, functional blocks and modules, and/or the like.

Scanning for Network Vulnerabilities

Figure 3:
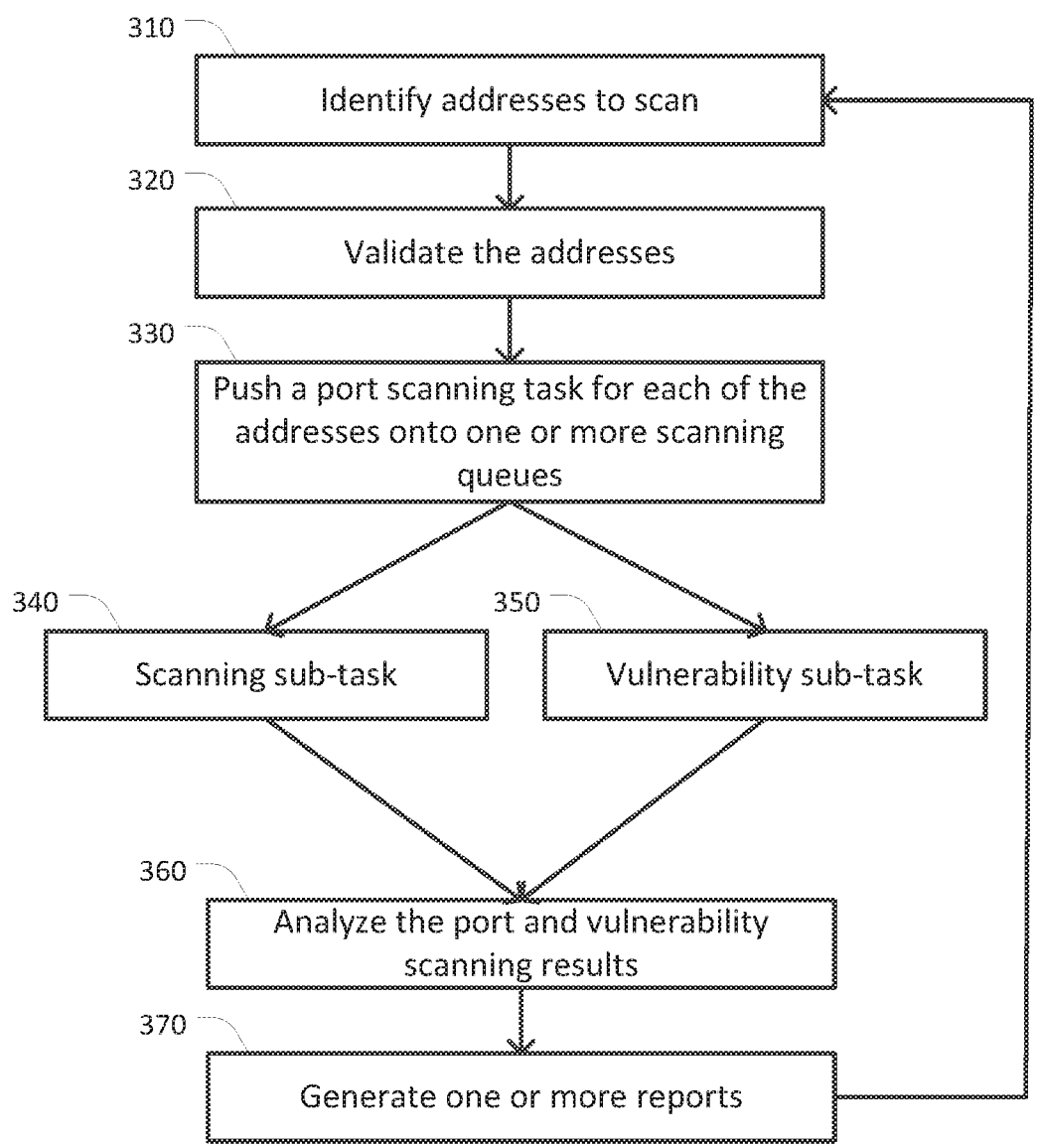
FIG. 3 sets forth a flow diagram of method steps for scanning computing devices for network vulnerabilities to implement one or more aspects of the various embodiments.

FIG. 3 sets forth a flow diagram of method steps for scanning computing devices for network vulnerabilities to implement one or more aspects of the various embodiments. One or more of the steps of FIG. 3 may be implemented, at least in part, in the form of executable code stored on non-transitory, tangible, machine readable media that when run by one or more processors (e.g., processor 112 in computing device 110) may cause the one or more processors to perform one or more of the steps. In some embodiments, the steps of FIG. 3 may be performed by one or more modules, such as security module 116, supervisor 210, port scanning dispatcher 240, vulnerability scanning dispatcher 260, and/or the one or more internal address detection modules 270. In some embodiments, the steps of FIG. 3 may be used to determine a list of target devices on which to perform a multi-tier network vulnerability analysis, manage the analysis using one or more services, such as services 150, 160, and/or 170, analyze the results, and generate one or more reports. Although the steps of FIG. 3 are described with reference to the embodiments of FIGS. 1 and 2, persons skilled in the art will understand that any system configured to implement the steps of FIG. 3, in any order, falls within the scope of the embodiments. In some embodiments, steps 320 and/or 370 are optional and may be omitted. In some embodiments, steps 330, 340, and/or 350 may be performed concurrently. In some embodiments, any of steps 340, 350, 360, and/or 370 may be performed concurrently.

At a step 310, one or more addresses to scan are identified. In some examples, security module 116 and/or supervisor 210 determines the addresses of one or more target devices that are to be analyzed for network vulnerabilities. In some examples, security module 116 and/or supervisor 210 may identify the addresses using the one or more address detecting services 170. In some examples, the addresses of the one or more target devices (e.g., target device 130) may be determined based on DNS information, ownership information, ASN information, certificate information, and/or the like and/or using one or more tracking services as described above with respect to FIG. 2. In some examples, each of the one or more addresses may be an IP address.

At an optional step 320, the one or more addresses of the one or more target devices identified during step 310 are validated. In some examples, the one or more addresses are verified using DNS information, active directory information, and/or the like determined using the one or more internal address detection modules 270 as described above with respect to FIG. 2. In some examples, when there is a discrepancy between addresses provided by the one or more internal address detection modules 270 and the one or more address detecting services 170, an alert may be sent to a user, an anomaly may be logged in a report, and/or the like. In some examples, the discrepancy may include a difference in addresses for a target device, target devices known to the one or more internal address detection modules 270 for which addresses are not provided by the one or more address detecting services 170, target devices for which the one or more address detecting services 170 report an address which are not known to the one or more internal address detection modules 270, and/or the like.

At a step 330, a port scanning task for each of the one or more addresses of the one or more target devices determined during step 310 and optionally validated during step 320 is pushed onto one or more scanning queues. In some examples, the one or more scanning queues include primary port scanning queue 220 and/or secondary port scanning queue 230. In some examples, the port scanning task is pushed onto a respective one of the one or more scanning queues based on whether the address and/or the target device associated with the port scanning task has a previous history of being difficult to port scan. In some examples, a port scanning task with an address and/or target device that has fewer than a threshold number of failed, slow, incomplete, and/or anomalous port scans during a configurable number of primary scans is pushed onto primary port scanning queue 220 at a primary scanning frequency. In some examples, a port scanning task associated with an address and/or target device that has the same or more than the threshold number of failed, slow, incomplete, and/or anomalous port scans during the configurable number of primary scans is pushed onto secondary port scanning queue 230 at a secondary scanning frequency.

After step 330 begins pushing the port scanning tasks on the one or more scanning queues, a scanning subtask 340 and a vulnerability subtask 350 are started. In some examples, step 330 does not need to complete before scanning subtask 340 and/or vulnerability subtask 350 may begin. In some examples, each of scanning subtask 340 and vulnerability subtask 350 may be started in a different operating system thread, an operating system step, and/or the like.

Assigning and Processing the Results of Port Scanning Tasks

Scanning subtask 340 is responsible for assigning port scanning tasks to port scanning services, such as the one or more port scanning services 150. FIG. 4 sets forth a flow diagram of method steps for port scanning target devices using port scanning services to implement one or more aspects of the various embodiments. One or more of the steps of FIG. 4 may be implemented, at least in part, in the form of executable code stored on non-transitory, tangible, machine readable media that when run by one or more processors (e.g., processor 112 in computing device 110) may cause the one or more processors to perform one or more of the steps of FIG. 4. In some embodiments, the steps of FIG. 4 may be performed by one or more modules, such as security module 116, supervisor 210, and/or port scanning dispatcher 240. In some embodiments, the steps of FIG. 4 may be used to assign port scanning tasks to the one or the more port scanning services 150, receive the results of port scans from the one or more port scanning services 150, and determine a response to the report. Although the steps of FIG. 4 are described with reference to the embodiments of FIGS. 1 and 2, persons skilled in the art will understand that any system configured to implement steps of FIG. 4, in any order, falls within the scope of the embodiments.

At a step 410, port scanning dispatcher 240 waits for a message from one of the one or more port scanning services 150. In some examples, port scanning dispatcher 240 may listen for incoming network traffic on a port assigned to port scanning dispatcher 240. In some examples, port scanning dispatcher 240 may support a representational state transfer (REST) application programming interface (API) that the one or more port scanning services 150 may use to send the message to port scanning dispatcher 240. In some examples, a connection (e.g., a TCP connection) may be opened between port scanning dispatcher 240 and port scanning service 150 to simplify the exchange of follow-up messages between port scanning dispatcher 240 and port scanning service 150. In some examples, the message from the one or more port scanning services 150 may be initiated in response to port scanning dispatcher 240 sending a request to each of the one or more port scanning services 150 indicating that port scanning dispatcher 240 has port scanning tasks ready to be assigned.

At a step 420, a type of the message received during step 410 is determined. In some examples, the type of the message may be determined by parsing the content of the message for one or more keywords, and/or the like. When the message is determined to be a request by port scanning service 150 for another port scanning task, the request is handled beginning with a step 430. When the message is determined to be a result of a port scanning task, the result is handled beginning with a step 450.

At the step 430, a port scanning task is popped from one of the scanning queues. As described above with respect to the examples of FIG. 2, the port scanning task is popped from either primary port scanning queue 220 or secondary port scanning queue 230. In most cases, port scanning dispatcher 240 pops the port scanning task from primary port scanning queue 220 as each of the port scanning tasks in primary port scanning queue 220 should be completed at the current primary scanning frequency, whereas the port scanning tasks in secondary port scanning queue 230 may be completed at the less frequent secondary scanning frequency. In some examples, port scanning dispatcher 240 may pop the port scanning task from secondary port scanning queue 230 rather than primary port scanning queue 220 based on one or more of a number of port scanning tasks in secondary port scanning queue 230, an expected time to complete a port scanning task in secondary port scanning queue 230, an amount of time remaining in a current secondary scanning period, an amount of time remaining in a current primary scanning period, and/or the like.

In some embodiments, port scanning dispatcher 240 may additionally and/or alternatively consider one or more additional criteria when assigning port scanning tasks to one of the one or more port scanning services 150 rather than simply popping the next port scanning task off the primary port scanning queue 220 or secondary port scanning queue 230. In some examples, the one or more additional criteria may include a geographic location of port scanning service 150 to which the port scanning task is to be assigned, a service provider for port scanning service 150, a geographic location of a target device 130 corresponding to the port scanning task, a service provider of target device 130, a number of network hops between port scanning service 150 and target device 130, an address of port scanning service 150, whether the port scanning service 150 has recently successfully and/or unsuccessfully completed a port scan of target device 130, and/or the like. In some embodiments, port scanning dispatcher 240 may additionally and/or alternatively assign port scanning tasks to one of the one or more port scanning services 150 to provide diversity and/or variability to which of the one or more port scanning services 150 is used to perform a port scanning task on a particular target device 130. In some embodiments, one or more heuristic rules may be used to assign a port scanning service 150 to a port scanning task.

At a step 440, the port scanning task is sent to the port scanning service 150 making the request received during step 410. In some examples, the port scanning task identifies an address, such as an IP address, of the target device that is to be the subject of the port scanning task to be performed by port scanning service 150. In some examples, the port scanning task may also include a target scanning duration in which port scanning service 150 is expected to complete the port scan.

Once the port scanning task is sent to port scanning service 150, control returns to step 410 to handle additional messages from others of the one or more port scanning services 150 while the just assigned port scanning task is being completed.

At the step 450, a type of the result received from port scanning service 150 is determined. In some examples, the type of the result may be determined from one or more status indicators, text strings, and/or the like in the result. When port scanning service 150 reports a successful port scan, the results are processed beginning with a step 460. When port scanning service 150 reports an anomalous port scan, the results are processed beginning with a step 480. When port scanning service 150 reports an incomplete port scan, the results are processed beginning with a step 490.

At the step 460, the results of the port scan are stored. In some examples, the results may be stored in one or more database tables. In some examples, the results may include a list of ports on the target device at the address associated with the port scanning task that are opened and/or an identification of a respective service listening on each of the respective open ports. In some examples, the stored results may further include an elapsed time to perform the port scanning, a scan rate of the port scan, and/or the like. In some examples, the stored results may further include an identifier of port scanning service 150 that performed the port scanning.

At a step 470, a vulnerability scanning task for each of the open ports is pushed onto vulnerability scanning queue 250. In some examples, the vulnerability scanning task identifies a combination of the address associated with the port scanning task and the port found to be open during the port scanning task. In some examples, the vulnerability scanning task includes the identification of the respective service listening on the open port.

After each of the vulnerability scanning tasks is pushed onto vulnerability scanning queue 250, control returns to step 410 to wait for additional messages. In some alternate embodiments, control may return to step 430 to immediately assign another port scanning task to port scanning service 150 rather than waiting for port scanning service 150 to send a message indicating that port scanning service 150 is ready for a next port scanning task.

At the step 480, the anomalous result of the port scanning task is reported. In some examples, the anomalous result may be provided to the user via one or more alerts. In some examples, the anomalous result may be added to an anomaly report. In some examples, the anomalous result may be indicated when a quick first pass scan of the ports of the target device results in a different list of open ports than a more detailed second pass scan of the ports of the target device. In some examples, the target device and/or the address associated with the anomalous result may be also be marked so that future port scanning tasks for the target device and/or the address are pushed onto secondary port scanning queue 230. In some examples, the port scanning task may optionally be requeued using a step similar to step 490 (as described below).

After the anomalous result of the port scanning task is reported, control moves to step 460 to store the results of the port scan. In some examples, step 470 may then either push a vulnerability scanning task onto vulnerability scanning queue 250 for each of the open ports found in the first pass scan of the ports or the detailed second pass scan of the ports.

At the step 490, the incomplete port scanning task is requeued. In some examples, when the port scanning task was popped from secondary port scanning queue 230 during step 430, the port scanning task is requeued to secondary port scanning queue 230. In some examples, when the port scanning task was popped from primary port scanning queue 220 during step 430, the port scanning task is requeued to either primary port scanning queue 220 or secondary port scanning queue 230 depending on whether the incomplete results of the current port scanning results in the threshold number of failed, slow, incomplete, and/or anomalous port scans during the configurable number of primary scans being reached for the target device and/or address.

After the port scanning task is requeued, control returns to step 410 to wait for additional messages. In some alternate embodiments, control may return to step 430 to immediately assign another port scanning task to port scanning service 150 rather than waiting for port scanning service 150 to send a message indicating that ports canning service 150 is ready for a next port scanning task.

Assigning and Processing the Results of Vulnerability Scanning Tasks

Figure 5:
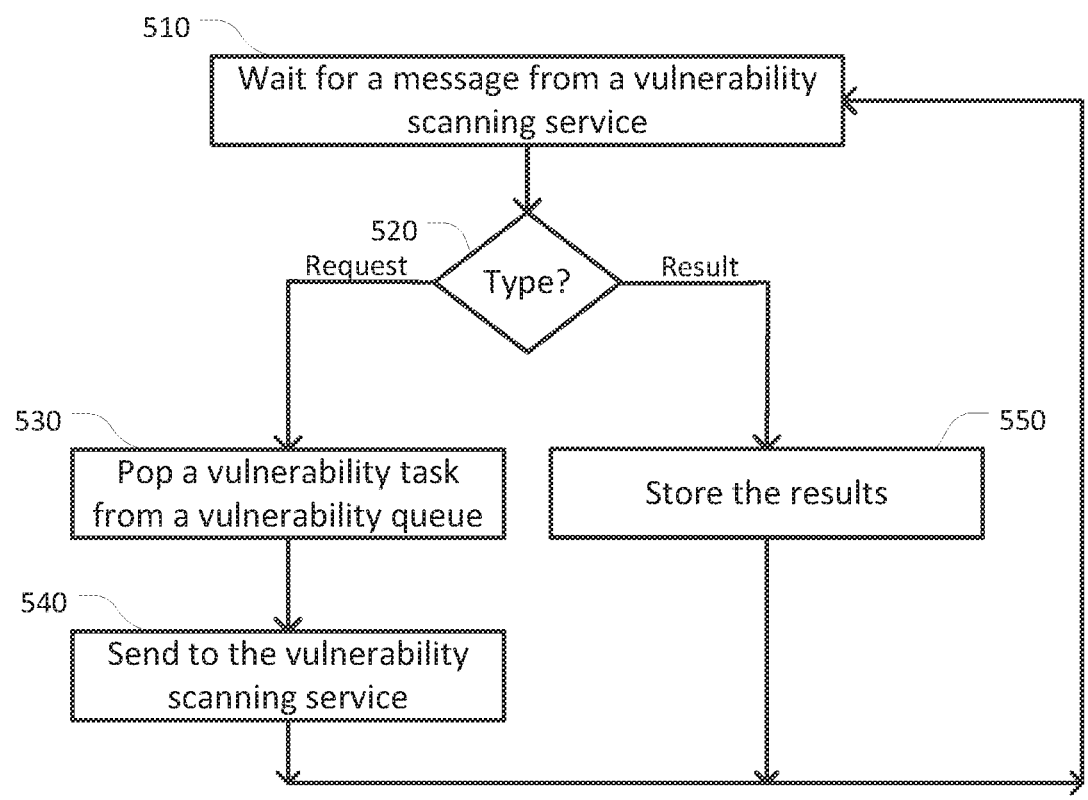
FIG. 5 sets forth a flow diagram of method steps for vulnerability scanning of open ports on target devices, according to various embodiments.

Referring back to FIG. 3, vulnerability subtask 350 is responsible for assigning vulnerability scanning tasks to one or more vulnerability scanning services 160. FIG. 5 sets forth a flow diagram of method steps for vulnerability scanning of open ports on target devices to implement one or more aspects of the various embodiments. One or more of the steps of FIG. 5 may be implemented, at least in part, in the form of executable code stored on non-transitory, tangible, machine readable media that when run by one or more processors (e.g., processor 112 in computing device 110) may cause the one or more processors to perform one or more of the steps 510-550. In some embodiments, the steps of FIG. 5 may be performed by one or more modules, such as security module 116, supervisor 210, and/or vulnerability scanning dispatcher 260. In some embodiments, the steps of FIG. 5 may be used to assign vulnerability scanning tasks to the one or more vulnerability scanning services 160, receive the results of vulnerability scans from the one or more vulnerability scanning services 160, and determine a response to the report. Although the steps of FIG. 5 are described with reference to the embodiments of FIGS. 1 and 2, persons skilled in the art will understand that any system configured to implement the steps of FIG. 5, in any order, falls within the scope of the embodiments.

At a step 510, vulnerability scanning dispatcher 260 waits for a message from one of the one or more vulnerability scanning services 160. In some examples, vulnerability scanning dispatcher 260 may listen for incoming network traffic on a port assigned to vulnerability scanning dispatcher 260. In some examples, vulnerability scanning dispatcher 260 may support a REST API that the one or more vulnerability scanning services 160 may use to send the message to vulnerability scanning dispatcher 260. In some examples, a connection (e.g., a TCP connection) may be opened between vulnerability scanning dispatcher 260 and vulnerability scanning service 160 to simplify the exchange of follow-up messages between vulnerability scanning dispatcher 260 and vulnerability scanning service 160. In some examples, the message from the one or more vulnerability scanning services 160 may be initiated in response to vulnerability scanning dispatcher 260 sending a request to each of the one or more vulnerability scanning services 160 indicating that vulnerability scanning dispatcher 260 has vulnerability scanning tasks ready to be assigned.

At a step 520 a type of the message received during step 510 is determined. In some examples, the type of the message may be determined by parsing the content of the message for one or more keywords, and/or the like. When the message is determined to be a request by vulnerability scanning service 160 for another vulnerability scanning task, the request is handled beginning with a step 530. When the message is determined to be a result of vulnerability scanning task, the result is handled beginning with a step 550.

At the step 530, a vulnerability scanning task is popped from vulnerability scanning queue 250.

At a step 540, the vulnerability scanning task is sent to the vulnerability scanning service 160 making the request received during step 510. In some examples, the vulnerability scanning task identifies an address, such as an IP address, and port combination of the target device that is to be the subject of the vulnerability scanning task to be performed by vulnerability scanning service 160. In some examples, the vulnerability scanning task may also include any information regarding a service listening on the port as reported from the port scanning results.

Once the vulnerability scanning task is sent to vulnerability scanning service 160, control returns to step 510 to handle additional messages from others of the one or more vulnerability scanning services 160 while the just assigned vulnerability scanning task is being completed.

At the step 550, the results of the vulnerability scan are stored. In some examples, the results may be stored in one or more database tables. In some examples, the results may include a list of vulnerabilities detected on the address and port combination of the target device. In some examples, the stored results may further include an elapsed time to perform the vulnerability scanning. In some examples, the stored results may further include an identifier of vulnerability scanning service 160 that performed the vulnerability scanning.

After the results of the vulnerability scanning are stored, control returns to step 510 to wait for additional messages. In some alternate embodiments, control may return to step 530 to immediately assign another vulnerability scanning task to vulnerability scanning service 160 rather than waiting for vulnerability scanning service 160 to send a message indicating that vulnerability scanning service 160 is ready for a next vulnerability scanning task.

Referring back to FIG. 3, at a step 360, the results of the port and vulnerability scanning are analyzed. In some examples, the analysis includes determining a level of coverage of the target devices, such as indicated by a percentage of target devices which were completely scanned, a percentage of ports on the target devices which were scanned, a number of open ports found during the port scanning, a list of vulnerabilities detected during the vulnerability scanning, a change in a number of open ports and/or vulnerabilities noted for a particular target device, a time taken to perform the port scanning and/or the vulnerability scanning for the target devices, and/or the like. In some examples, the analysis may be based on custom analysis scripts provided by one or more users of security module 116.

At an optional step 370, one or more reports are generated from the analysis performed during step 360. In some examples, the reports may be displayed on output device. In some examples, the reports may be sent to one or more users via email and/or some other messaging service. In some examples, the reports may be based on standard and/or custom templates.

After the results of the port and vulnerability scanning are analyzed and/or optionally reported, the steps of FIG. 3 may be repeated by returning to step 310. In some examples, the steps of FIG. 3 are performed once per primary scanning period (where steps 320 and 370 are optional and may be excluded).

Two-Pass Port Scanning

Figure 6:
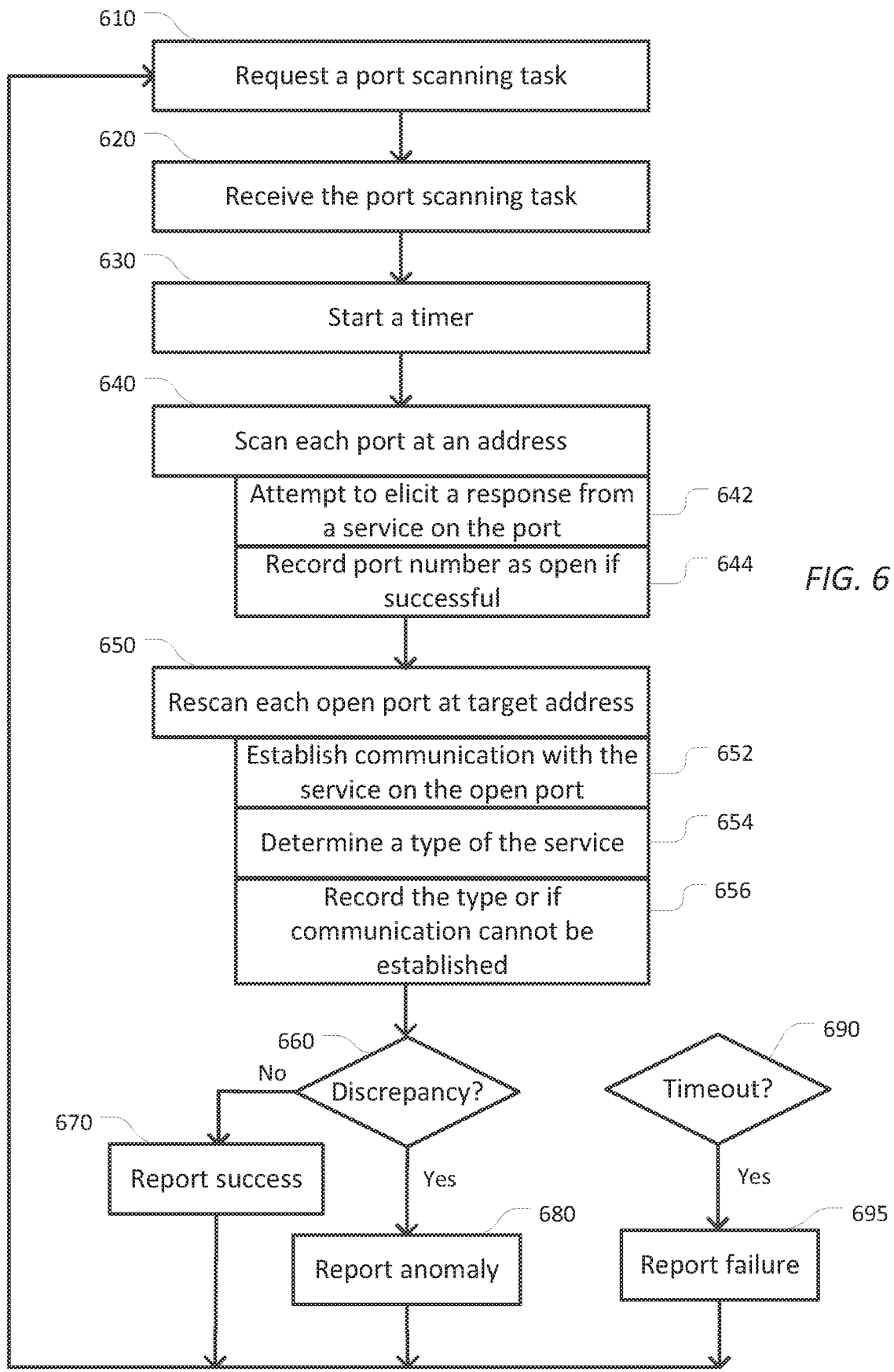
FIG. 6 sets forth a flow diagram of method steps for scanning ports on a target device to implement one or more aspects of the various embodiments.

FIG. 6 sets forth a flow diagram of method steps for scanning ports on a target device to implement one or more aspects of the various embodiments. One or more of the steps of FIG. 6 may be implemented, at least in part, in the form of executable code stored on non-transitory, tangible, machine readable media that when run by one or more processors (e.g., processor 144 in agent device 140) may cause the one or more processors to perform one or more of the steps of FIG. 6. In some embodiments, the steps of FIG. 6 may be performed by one or more modules or services, such as port scanning service 150. In some embodiments, the steps of FIG. 6 may be used to perform a two-pass port scanning of a target device identified by an address in an assigned port scanning task and report the results of the port scanning. Although the steps of FIG. 6 are described with reference to the embodiments of FIGS. 1 and 2, persons skilled in the art will understand that any system configured to implement the steps of FIG. 6, in any order, falls within the scope of the embodiments.

At a step 610, a port scanning task is requested. In some examples, port scanning service 150 may request the port scanning task from port scanning dispatcher 240, such as by sending one or more messages to port scanning dispatcher 240 via network 120. In some examples, the request may be part of a report of port scanning results, such as may occur in steps 670, 680, and/or 695, which are described in further detail below.

At a step 620, the port scanning task is received. In some examples, port scanning service 150 receives the scanning task from port scanning dispatcher 240 via network 120. The port scanning task includes an address, such as an IP address, of a target device 130 for which a two-pass port scanning is to be performed by port scanning service 150. In some examples, the port scanning task further includes a target scanning duration in which port scanning service 150 is expected to complete the port scanning task.

At a step 630, a timer is started. The timer is used to keep track of the amount of time spent by port scanning service 150 to complete the two-pass port scanning of target device 130 identified by the address included in the port scanning task. In some examples, the timer is initialized with the target scanning duration included in the port scanning task and operates in a count-down fashion.

At a step 640, port scanning service 150 scans each of the ports at the address in a first pass scan. In some examples, the first pass scan is relatively rapid as the goal is just to determine which ports are open and have a service 138 listening on the port. In some example, port scanning service 150 scans each of the ports one at a time using a single processing thread. In some examples, port scanning service 150 scans two or more of the ports at a time using corresponding processing threads. In some examples, each of the ports corresponds to the TCP and/or UDP ports of target device 130. In some examples, 50,000 or more ports may be scanned. In some examples, all of the TCP and/or UDP ports (e.g., 65,536 ports) may be scanned. For each of the ports being scanned, port scanning service 150 first attempts to elicit a response from service 138 on the port using a sub-step 642. In some examples, when service 138 is a TCP service, port scanning service 150 may determine that there is a service 138 listening on the port when the TCP three-way handshake is completed with service 138. In some examples, when the TCP three-way handshake is not completed, port scanning service 150 may determine whether there is a UDP service listening on the port by sending a UDP packet to the port and, when an Internet Control Message Protocol (ICMP) port unreachable message is returned, determine that there is no UDP service that is listening. In some examples, other port scanning approaches such as SYN scanning, ACK scanning, window scanning, FIN scanning, and/or any other type of feasible port scanning may be used to determine whether there is a service 138 listening on the port. In some examples, when port scanning service 150 is not able to determine whether the port is open and has a service 138 that is listening, port scanning services 150 may make one or more additional attempts to determine whether the port is open and has a service 138 that is listening to account for lost network packets, port scan blocking by the target device, and/or the like. When port scanning service 150, determines that the port is open and has a service 138 that is listening, port scanning service 150 records the port number on a list of open ports for the address using a sub-step 644.

At a step 650, port scanning service rescans each of the open ports (e.g., the ports on the list of open ports) in a second pass scan. In some examples, the second pass scan is slower than the first pass scan as the goal of the second pass scan is to confirm that each of the ports on the list of open port is open and has a service 138 that is listening and to attempt to identify a type of that service 138. In some examples, the second pass scan may use one or more processing threads to concurrently scan one or more of the open ports. In some examples, for each of the ports on the list of open ports, port scanning service 150 first attempts to establish communication with service 138 by opening up a TCP connection with a TCP service 138 and/or sending one or more UDP packets for a UDP service 138 using a sub-step 652. Once communication is established with service 138, port scanning service 150 determines a type of service 138 using a sub-step 654. In some examples, the type of service 138 may be determined by parsing the one or more responses from service 138 to identify a protocol identifier (e.g., a TCP and/or UDP protocol number), specific header, banner, and/or other information. In some examples, the type of service 138 may include a protocol name or number as well as a version number. At a sub-step 656, the type of service 138 is recorded when the type is determined by sub-step 654 or an indication of whether communication could not be established with service 138 is recorded.

At a step 660, it is determined whether there is a discrepancy between the list of open ports generated during the first pass scan as recorded by sub-step 644 and the results of the second pass scan as recorded by sub-step 656. When there is no discrepancy, success is reported using a step 670. When there is a discrepancy, an anomaly is reported using a step 680.

At the step 670, successful two-pass scanning of the ports for the address is reported to port scanning dispatcher 240. Further, the results of the two-pass scan, including the open port numbers recorded during sub-step 644, are returned to port scanning dispatcher 240. In some examples, the types of each of the respective services 138 at each of the open ports recorded during sub-step 656 is also returned to port scanning dispatcher 240. Upon completion of step 670, control returns to step 610 where port scanning service 150 requests another port scanning task.

At the step 680, an anomaly is reported to port scanning dispatcher 240. The anomaly indicates that there is a discrepancy in the ports identified as open between the first pass scan and the second pass scan. In some examples, the results of the two-pass scan including the open port numbers recorded during sub-step 644 are returned to port scanning dispatcher 240 and/or the types of each of the respective services 138 at each of the open ports recorded during sub-step 656 is also returned to port scanning dispatcher 240. Upon completion of step 680, control returns to step 610 where port scanning service 150 requests another port scanning task.

At a step 690, it is determined whether a timeout in the timer starting during step 630 has occurred. When the timer times out, the time out indicates that port scanning service 150 has taken longer than the target scanning duration to complete the two-pass port scanning of steps 640, 650, 660, 670, and/or 680. In some examples, the two-pass port scanning may take too long when port scanning service 150 is unable to reach and/or connect with target device 130 associated with the address, when there is too much network congestion between port scanning service 150 and target device 130, when a firewall at target device 130 is interfering with port scanning, when a provider hosting target device 130 is limiting and/or blocking port scanning activities, when target device 130 is being operated as a honey pot (e.g., a target device set-up to attract attackers) and has too many ports open, and/or the like. When the timer has not timed out, the performance of steps 640-680 is allowed to continue. When the timer times out, a failure is reported using a step 695.

At the step 695, port scanning service 150 aborts steps 640, 650, and/or sub-steps 642, 644, 652, 654, and/or 656 and reports to port scanning dispatcher 240 that port scanning service 150 was not able to complete the port scanning task within the target scanning duration. Upon completion of step 695, control returns to step 610 where port scanning service 150 requests another port scanning task.

As discussed above and further emphasized here, FIG. 6 is merely an example which should not unduly limit the scope of the claims. One of ordinary skill in the art would recognize many variations, alternatives, and modifications. According to some embodiments, port scanning service 150 may use other techniques than a timer to determine whether the target scanning duration has been exceeded. In some examples, an elapsed time of the two-pass port scanning may be monitored periodically during the performance of steps 640, 650, and/or sub-steps 642, 644, 652, 654, and/or 656 to see whether the target scanning during has been exceeded. In some examples, when port scanning service 150 is not able to connect with target device 130, port scanning service 150 may report a failure using step 695 without waiting for the target scanning duration to elapse.

In sum, the disclosed techniques may be used to efficiently and comprehensively analyze a plurality of target devices for network vulnerabilities. In one an embodiment, a security module includes, without limitation, a supervisor module, a primary port scanning queue, a secondary port scanning queue, a port scanning dispatcher, a vulnerability scanning queue, and a vulnerability scanning dispatcher. The supervisor module first uses one or more address detecting services to identify an address for each of a plurality of target devices that are to be analyzed for network vulnerabilities. The supervisor module the coordinates the activity of the activity of the primary port scanning queue, the secondary port scanning queue, the port scanning dispatcher, the vulnerability scanning queue, and the vulnerability scanning dispatcher to create a port scanning task for each of the target devices, assign each of the port scanning tasks to a port scanning service, use the results of the port scanning tasks to create a vulnerability scanning task for each of the open ports, assign each of the vulnerability scanning tasks to a vulnerability scanning service. The supervisor module then analyzes the results of the port scanning tasks and the vulnerability scanning tasks to generate one or more reports describing any potential network vulnerabilities identified during the various scans. In some examples, for each port scanning task, the port scanning service assigned to the port scanning task performs a two-pass port scan on the target device associated with the port scanning task. In the first pass of the port scan, the port scanning service assigned to the port scanning task determines which ports on the target device associated with the port scanning task are open. In the second pass of the port scan, the port scanning service assigned to the port scanning task determines which service is listening at each of the ports identified during the first pass of the port scan.

At least one technical advantage of the disclosed techniques relative to the prior art is that the disclosed techniques can be used to verify that the target devices of an enterprise are being effectively identified, even when those target devices are being brought into service, are being removed from service, and/or are being assigned to different IP addresses. Not only does the identification of the target devices help ensure that all of the target devices are being assessed for network vulnerabilities, but the identification of the target devices also helps ensure that a port scanning "attack" is not being inadvertently performed on a target device controlled by another entity. Additionally, the disclosed techniques employ a tiered scanning approach that allows the port scanning and network vulnerability assessment to be performed more efficiently and with fewer computing resources relative to prior art approaches by limiting more time consuming and/or costly scans to only those target devices and/or ports that need the more time consuming and/or costly scans. The disclosed techniques further provide automated mechanisms for assigning scanning and vulnerability assessment resources, identifying target devices that require atypical scanning and network vulnerability assessment approaches, and/or identifying target devices with anomalous scanning results. These technical advantages provide one or more technological advancements over prior art approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

1. According to some embodiments, a computer-implemented method for analyzing network vulnerabilities includes determining an address for each target device included in a plurality of target devices; for each target device included in the plurality of target devices, assigning a port scanning task to an associated port scanning service, the port scanning task being associated with the target device via the address of the target device; for each port scanning task, receiving a port scanning result from the port scanning service assigned to the port scanning task, the port scanning result including a list of one or more open ports for the target device associated with the port scanning task; for each open port included in each port scanning result, assigning a vulnerability scanning task to an associated vulnerability service; receiving a vulnerability scanning result for each vulnerability scanning task; and generating a report based on at least one of the port scanning results or the vulnerability scanning results.

2. The computer-implemented method according to clause 1, wherein each port scanning task is further associated with a duration in which the port scanning task is to be completed.

3. The computer-implemented method according to clause 1 or clause 2, wherein the duration is determined based on an expected amount of time to perform the port scanning task.

4. The computer-implemented method according to any of clauses 1-3, wherein each port scanning task requests that the port scanning service associated with the port scanning task perform a two-pass port scan, wherein a first pass identifies the open ports and a second pass identifies a service listening at each of the open ports.

5. The computer-implemented method according to any of clauses 1-4, wherein assigning each port scanning task includes pushing the port scanning task onto one of one or more port scanning queues based on a frequency at which successive port scans of the target device associated with the port scanning task are to be performed; and popping the port scanning task from the one of the one or more port scanning queues in response to receiving a request from the port scanning service associated with the port scanning task.

6. The computer-implemented method according to any of clauses 1-5, further comprising pushing the port scanning task back onto one of the one or more port scanning queues in response to the port scanning service associated with the port scanning task reporting an inability to complete a port scan of the target device associated with the port scanning task.

7. The computer-implemented method according to any of clauses 1-6, wherein assigning the vulnerability scanning task includes pushing the vulnerability scanning task onto a queue; and popping the vulnerability scanning task from the queue in response to receiving a request from the associated vulnerability scanning service.

8. The computer-implemented method according to any of clauses 1-7, wherein determining the address for each target device comprises using one or more address detecting services, each of the one or more address detecting services using at least one of domain name service (DNS) information, ownership information, autonomous system number (ASN) information, certificate information, or tracking information from opted-in end users.

9. The computer-implemented method according to any of clauses 1-8, further comprising, in response to the port scanning service associated with a first port scanning task reporting an inability to port scan the target device associated with the first port scanning task within a target scanning duration, changing a scanning frequency for the target device associated with the first port scanning task.

10. The computer-implemented method according to any of clauses 1-9, further comprising, in response to the port scanning service associated with a first port scanning task reporting an anomalous port scan for the target device associated with the first port scanning task, reporting a discrepancy between a first pass scan of ports of the target device associated with the first port scanning task and a second pass scan of the ports of the target device associated with the port scanning task.

11. According to some embodiments, a non-transitory computer-readable storage medium including instructions that, when executed by a processor, cause the processor to analyze network vulnerabilities by performing steps including determining an IP address for each computing device included in a plurality of computing devices; for each computing device included in the plurality of computing devices, assigning a port scanning task to an associated port scanning service, the port scanning task being associated with the computing device via the IP address of the computing device; for each port scanning task, receiving a port scanning result from the port scanning service assigned to the port scanning task, the port scanning result including a list of one or more open ports for the computing device associated with the port scanning task; for each open port included in each port scanning result, assigning a vulnerability scanning task to an associated vulnerability service, the port scanning task being associated with the IP address of the computing device associated the port scanning result and the open port; receiving a vulnerability scanning result for each vulnerability scanning task; and generating a report based on the port scanning results, the vulnerability scanning results, or both the port scanning results and the vulnerability scanning results.

12. The non-transitory computer-readable storage medium according to clause 11, wherein each port scanning task requests that the port scanning service associated with the port scanning task perform a two-pass port scan, wherein a first pass identifies the open ports and a second pass identifies a service listening at each of the open ports.

13. The non-transitory computer-readable storage medium according to clause 11 or clause 12, wherein the steps further comprise, in response to the port scanning service associated with a first port scanning task reporting an inability of port scan the computing device associated with the first port scanning task within a target scanning duration, changing a scanning frequency for the computing device associated with the first port scanning task.

14. The non-transitory computer-readable storage medium according to any of any of clauses 11-13, wherein the steps further comprise, in response to the port scanning service associated with a first port scanning task reporting a failed, slow, incomplete, or anomalous port scan of the computing device associated with the first port scanning task within a target scanning duration, changing a scanning frequency for the computing device associated with the first port scanning task.

15. The non-transitory computer-readable storage medium according to any of clauses 11-14, wherein the steps further comprise, in response to a first computing device having a same or more than a threshold number of failed, slow, incomplete, or anomalous port scans during a configurable number of port scans, reducing a port scanning frequency for the first computing device.

16. According to some embodiments, a computing device includes a memory; and a processor coupled to the memory; wherein the processor is configured to determine an IP address for each target device included in a plurality of target devices; for each target device included in the plurality of target devices, assign a port scanning task to an associated port scanner, the port scanning task being associated with the target device via the IP address of the target device and a duration in which the port scanning task is to be completed; for each port scanning task, receiving a port scanning result from the port scanner assigned to the port scanning task, the port scanning result including a list of one or more open ports for the target device associated with the port scanning task; for each open port included in each port scanning result, assigning a vulnerability scanning task to an associated vulnerability scanner; receiving a vulnerability scanning result for each vulnerability scanning task; and generating a report based on at least one of the port scanning results, at least one of the vulnerability scanning results, or at least one of both the port scanning results and at least one of the vulnerability scanning results; wherein each port scanning task requests that the port scanner associated with the port scanning task perform a two-pass port scan, wherein a first pass identifies the open ports and a second pass identifies a service listening at each of the open ports.

17. The computing device according to clause 16, wherein, in response to the port scanner associated with a first port scanning task reporting an inability of port scan the target device associated with the first port scanning task within a target scanning duration, the processor is further configured to change a scanning frequency for the target device associated with the first port scanning task.

18. The computing device according to clause 16 or clause 17, wherein to determine the IP address for each target device, the processor is configured to use one or more address detecting services, each of the one or more address detecting services using at least one of domain name service (DNS) information, ownership information, autonomous system number (ASN) information, certificate information, or tracking information from opted-in end users.

19. The computing device according to any of clauses 16-18, wherein for each target device, to determine the IP address of the target device, the processor is further configured to determine a same IP address for the target device from a predetermined number of address detecting services using the DNS information, the ownership information, the ASN information, or the certificate information.

20. The computing device according to any of clauses 16-19, wherein, for each target device, the processor is configured to validate the IP address for the target device using one or more address detection modules.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for analyzing network vulnerabilities, the method comprising:
  determining an address for each target device included in a plurality of target devices, wherein determining the address for each target device comprises using one or more address detecting services, each of the one or more address detecting services using at least one of domain name service (DNS) information, autonomous system number (ASN) information, certificate information, or tracking information from opted-in end users;
  for each target device included in the plurality of target devices:
    pushing a port scanning task onto a primary port scanning queue or a secondary port scanning queue based on whether a number of failed, slow, incomplete, or anomalous port scans associated with the target device exceeds a threshold value, wherein a scanning frequency associated with the primary port scanning queue is greater than a scanning frequency associated with the secondary port scanning queue, the port scanning task being associated with the target device via the address of the target device, and
    assigning the port scanning task from the primary port scanning queue or the secondary port scanning queue to a port scanning service;
  for each port scanning task, receiving a port scanning result from the port scanning service assigned to the port scanning task, the port scanning result including a list of one or more open ports for the target device associated with the port scanning task;
  for each open port included in each port scanning result, assigning a vulnerability scanning task to an associated vulnerability scanning service;
  receiving a vulnerability scanning result for each vulnerability scanning task; and generating a report based on at least one of the port scanning results or the vulnerability scanning results.

2. The computer-implemented method of claim 1, wherein each port scanning task is further associated with a duration in which the port scanning task is to be completed.

3. The computer-implemented method of claim 2, wherein the duration is determined based on an expected amount of time to perform the port scanning task.

4. The computer-implemented method of claim 1, wherein each port scanning task requests that the port scanning service associated with the port scanning task perform a two-pass port scan, wherein a first pass identifies the open ports and a second pass identifies a service listening at each of the open ports.

5. The computer-implemented method of claim 1, wherein pushing each port scanning task comprises:
pushing the port scanning task onto one of the primary port scanning queue or the secondary port scanning queue based on a frequency at which successive port scans of the target device associated with the port scanning task are to be performed; and
popping the port scanning task from the one of the primary port scanning queue or the secondary port scanning queue in response to receiving a request from the port scanning service associated with the port scanning task.

6. The computer-implemented method of claim 5, further comprising pushing the port scanning task back onto one of the primary port scanning queue or the secondary port scanning queue in response to the port scanning service associated with the port scanning task reporting an inability to complete a port scan of the target device associated with the port scanning task.

7. The computer-implemented method of claim 1, wherein assigning the vulnerability scanning task comprises:
pushing the vulnerability scanning task onto a queue; and
popping the vulnerability scanning task from the queue in response to receiving a request from the associated vulnerability scanning service.

8. The computer-implemented method of claim 1, further comprising, in response to the port scanning service associated with a first port scanning task reporting an inability to port scan the target device associated with the first port scanning task within a target scanning duration, changing a scanning frequency for the target device associated with the first port scanning task.

9. The computer-implemented method of claim 1, further comprising, in response to the port scanning service associated with a first port scanning task reporting an anomalous port scan for the target device associated with the first port scanning task, reporting a discrepancy between a first pass scan of ports of the target device associated with the first port scanning task and a second pass scan of the ports of the target device associated with the first port scanning task.

10. A non-transitory computer-readable storage medium including instructions that, when executed by a processor, cause the processor to analyze network vulnerabilities by performing steps comprising:
determining an IP address for each computing device included in a plurality of computing devices, wherein determining the IP address for each computing device comprises using one or more address detecting services, each of the one or more address detecting services using at least one of domain name service (DNS) information, autonomous system number (ASN) information, certificate information, or tracking information from opted-in end users;
for each computing device included in the plurality of computing devices:
pushing a port scanning task onto a primary port scanning queue or a secondary port scanning queue based on whether a number of failed, slow, incomplete, or anomalous port scans associated with the computing device exceeds a threshold value, wherein a scanning frequency associated with the primary port scanning queue is greater than a scanning frequency associated with the secondary port scanning queue, the port scanning task being associated with the computing device via the IP address of the computing device, and
assigning the port scanning task from the primary port scanning queue or the secondary port scanning queue to a port scanning service;
for each port scanning task, receiving a port scanning result from the port scanning service assigned to the port scanning task, the port scanning result including a list of one or more open ports for the computing device associated with the port scanning task;
for each open port included in each port scanning result, assigning a vulnerability scanning task to an associated vulnerability service, the port scanning task being associated with the IP address of the computing device associated the port scanning result and the open port;
receiving a vulnerability scanning result for each vulnerability scanning task; and
generating a report based on the port scanning results, the vulnerability scanning results, or both the port scanning results and the vulnerability scanning results.

11. The non-transitory computer-readable storage medium of claim 10, wherein each port scanning task requests that the port scanning service associated with the port scanning task perform a two-pass port scan, wherein a first pass identifies the open ports and a second pass identifies a service listening at each of the open ports.

12. The non-transitory computer-readable storage medium of claim 10, wherein the steps further comprise, in response to the port scanning service associated with a first port scanning task reporting an inability of port scan the computing device associated with the first port scanning task within a target scanning duration, changing a scanning frequency for the computing device associated with the first port scanning task.

13. The non-transitory computer-readable storage medium of claim 10, wherein the steps further comprise, in response to the port scanning service associated with a first port scanning task reporting a failed, slow, incomplete, or anomalous port scan of the computing device associated with the first port scanning task within a target scanning duration, changing a scanning frequency for the computing device associated with the first port scanning task.

14. The non-transitory computer-readable storage medium of claim 10, wherein the steps further comprise, in response to a first computing device having a same or more than the threshold number of failed, slow, incomplete, or anomalous port scans during a configurable number of port scans, reducing a port scanning frequency for the first computing device.

15. A computing device, comprising:
a memory; and
a processor coupled to the memory;
wherein the processor is configured to:

determine an IP address for each target device included in a plurality of target devices, wherein determining the IP address for each target device comprises using one or more address detecting services, each of the one or more address detecting services using at least one of domain name service (DNS) information, autonomous system number (ASN) information, certificate information, or tracking information from opted-in end users;

for each target device included in the plurality of target devices:
  push a port scanning task onto a primary port scanning queue or a secondary port scanning queue based on whether a number of failed, slow, incomplete, or anomalous port scans associated with the target device exceeds a threshold value, wherein a scanning frequency associated with the primary port scanning queue is greater than a scanning frequency associated with the secondary port scanning queue, the port scanning task being associated with the target device via the IP address of the target device and a duration in which the port scanning task is to be completed, and
  assign the port scanning task from the primary port scanning queue or the secondary port scanning queue to a port scanner;

for each port scanning task, receive a port scanning result from the port scanner assigned to the port scanning task, the port scanning result including a list of one or more open ports for the target device associated with the port scanning task;

for each open port included in each port scanning result, assign a vulnerability scanning task to an associated vulnerability scanner;

receive a vulnerability scanning result for each vulnerability scanning task; and generate a report based on at least one of the port scanning results, at least one of the vulnerability scanning results, or at least one of both the port scanning results and at least one of the vulnerability scanning results;

wherein each port scanning task requests that the port scanner associated with the port scanning task perform a two-pass port scan, wherein a first pass identifies the open ports and a second pass identifies a service listening at each of the open ports.

16. The computing device of claim 15, wherein, in response to the port scanner associated with a first port scanning task reporting an inability of port scan the target device associated with the first port scanning task within a target scanning duration, the processor is further configured to change a scanning frequency for the target device associated with the first port scanning task.

17. The computing device of claim 15, wherein for each target device, to determine the IP address of the target device, the processor is further configured to determine a same IP address for the target device from a predetermined number of address detecting services using the DNS information, the ASN information, or the certificate information.

18. The computing device of claim 15, wherein, for each target device, the processor is configured to validate the IP address for the target device using one or more address detection modules.

* * * * *